No. 704,714. Patented July 15, 1902.
A. A. LAFOREST.
ATTACHMENT FOR SPECTACLES.
(Application filed Oct. 11, 1901.)
(No Model.)
Fig. I.
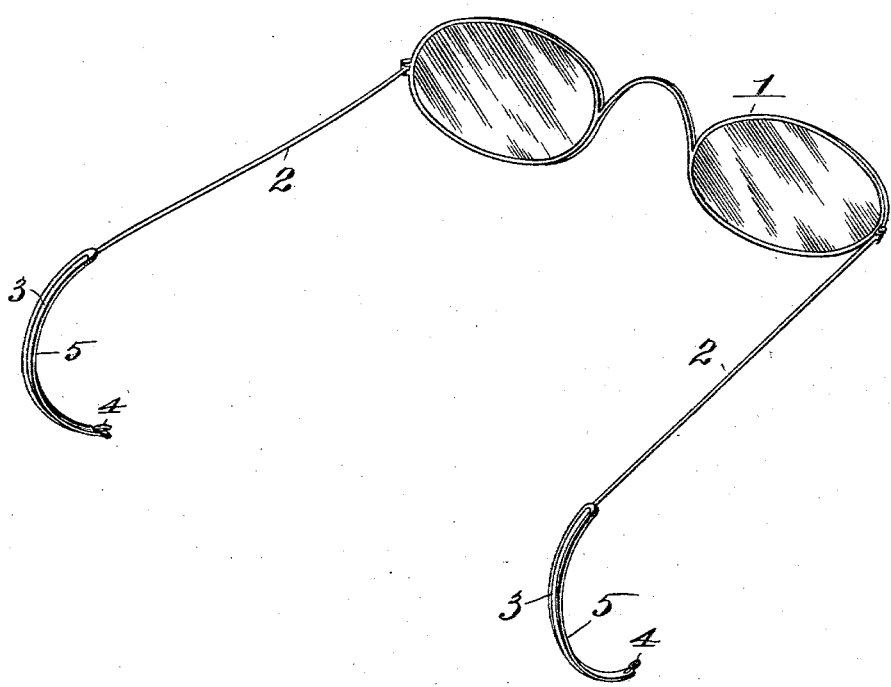
Fig. II.
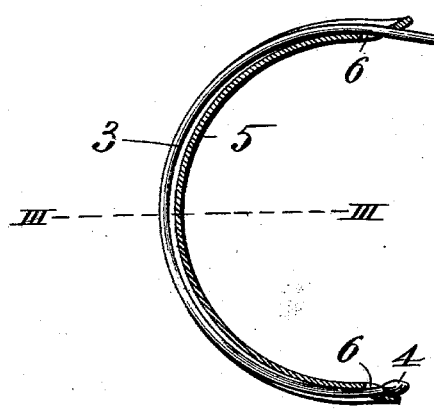
Fig. III.
attest:
M. P. Smith
E. S. Knight
Inventor:
Aubin A. Laforest;
By Wright Bro
atty's

UNITED STATES PATENT OFFICE.

AUBIN A. LAFOREST, OF ST. LOUIS, MISSOURI.

ATTACHMENT FOR SPECTACLES.

SPECIFICATION forming part of Letters Patent No. 704,714, dated July 15, 1902.

Application filed October 11, 1901. Serial No. 78,308. (No model.)

*To all whom it may concern:*

Be it known that I, AUBIN A. LAFOREST, a citizen of the United States, residing in the city of St. Louis, in the State of Missouri, have invented certain new and useful Improvements in Attachments for Spectacles, of which the following is a full, clear, and exact description, reference being had to the accompanying drawings, forming part of this specification.

My invention relates to an attachment adapted to be applied to the hooks of spectacle-temples that rest in the rear of the wearer's ears.

The object of the invention is to provide means whereby a bearing of greater width against the wearer's ears will be furnished to avoid cutting action by said hooks into the ears and also to furnish more comfortable bearing against the ears.

My invention consists in features of novelty hereinafter fully described, and pointed out in the claims.

Figure I is a perspective view of a pair of spectacles equipped with my attachment. Fig. II is an enlarged detail view of one of the hooks of the spectacle-temples, the attachment being shown in longitudinal section thereon. Fig. III is a cross-sectional view taken on line III III of Fig. II.

1 designates a pair of spectacles having temples 2, that are provided with hooks 3, bearing at their ends knobs 4.

5 designates curved channeled grooved flexible plates containing apertures 6, that receive the hooks of the spectacle-temples and provide for the threading of the plates onto said hooks. The plates 5 are preferably of spring metal and occupy positions within the hooks 3 and are of considerably greater width than said hooks, thereby providing a much greater bearing-surface against the rear of the ears of a person wearing the spectacles, and thereby avoiding chafing of the wearer's ears by contact therewith and obviate the cutting action so frequently experienced by wearers of spectacles consequent upon the bearing of the temple-hooks against the ears. The attachment of the plates to the hooks is sufficiently free, as shown in Fig. II, to permit of lateral movement thereof, so that the plates will always adjust themselves properly to the wearer's ears and remain in settled positions against the ears irrespective of slight movement of the spectacle temples and hooks.

I claim as my invention—

1. The combination with a pair of spectacles having a temple provided with a hook, of an attachment comprising a flexible plate loosely threaded at both ends onto the hook of said temple and lying on the inside of the curve thereof, and free from engagement with said hook, intermediate the ends of the plate, substantially as and for the purpose set forth.

2. The combination with a pair of spectacles having a temple provided with a hook, of an attachment comprising a channeled plate loosely threaded at both ends onto the hook of said temple and lying on the inside of the curve thereof, substantially as and for the purpose set forth.

3. The combination with a pair of spectacles having temples provided with hooks, of an attachment comprising a spring-strip threaded onto said temple-hooks at the insides thereof and so laterally connected to the hooks that lateral movement of the strips is provided with respect to said hooks, substantially as described.

AUBIN A. LAFOREST.

In presence of—
E. S. KNIGHT,
M. P. SMITH.